United States Patent [19]

Hogan

[11] Patent Number: 5,793,918
[45] Date of Patent: Aug. 11, 1998

[54] MOVABLE 3D DISPLAY

[76] Inventor: Richard J. Hogan, N8815 Branch Rd., Rte. 1 Box 184, Ixonia, Wis. 53036

[21] Appl. No.: 808,486

[22] Filed: Mar. 3, 1997

[51] Int. Cl.$^6$ .................................................. G02B 6/06
[52] U.S. Cl. .................... 385/116; 385/147; 385/901; 40/547; 40/800
[58] Field of Search ................ 340/286.01; 385/115, 385/116, 901, 147; 40/547, 800, 605

[56] References Cited

U.S. PATENT DOCUMENTS

| | | | |
|---|---|---|---|
| 3,604,780 | 9/1971 | Martin | 385/116 |
| 3,866,290 | 2/1975 | Norcross | 29/203 |
| 4,005,932 | 2/1977 | Gates | 353/6 |
| 4,148,645 | 4/1979 | Gates | 96/46 |
| 4,173,391 | 11/1979 | Schure et al. | 385/120 |
| 4,252,514 | 2/1981 | Gates | 425/162 |
| 4,411,489 | 10/1983 | McGrew | 350/3.76 |
| 4,412,799 | 11/1983 | Gates | 425/150 |
| 4,757,626 | 7/1988 | Weinreich | 40/427 |
| 4,898,536 | 2/1990 | Hoffarth | 434/114 |
| 5,082,350 | 1/1992 | Garcia et al. | 359/478 |
| 5,127,078 | 6/1992 | Terry et al. | 385/116 |
| 5,136,675 | 8/1992 | Hodson | 358/116 |
| 5,148,310 | 9/1992 | Batchko | 359/479 |
| 5,172,266 | 12/1992 | Garcia et al. | 359/478 |
| 5,574,576 | 11/1996 | Martin | 358/484 |

*Primary Examiner*—John D. Lee
*Assistant Examiner*—Ellen E. Kang
*Attorney, Agent, or Firm*—Whyte Hirschboeck Dudek SC

[57] ABSTRACT

This invention is a three-dimensional display apparatus that has the electromechanical ability to form a display into a relief of a video image. The physical formation of the display updates about 1/24th of a second for real time motion in sync with the video image. The displayed relief image is shown in true three-dimensional space that a user sees and feels. This is accomplished by a plurality of optic fiber bundles that have distal ends and proximal ends, the distal ends radiate outwardly from an image projector carrying a light image. An optic fiber adjustment assembly controllably moves the distal ends of the optic fibers away from and toward the image projector thus forming a moving three-dimensional relief image. A sensor determines the position of each of the distal ends of the optic fibers and then sends the position information to a computer. As the images shown by the projector change, a lookup table tells the computer to signal the optic fibers and move them in sync with the new projected images. Thus, as the optic fibers are adjusted, a new corresponding three-dimensional relief image is formed. The same computer controlled assemblies that extend and contract the optic fibers may be also used to detect and react to the user's touch through the sensors that monitor the position of the optic fiber bundles.

20 Claims, 9 Drawing Sheets

1
MOVABLE 3D DISPLAY

BACKGROUND OF THE INVENTION

1. Field of the Invention

The present invention relates to three-dimensional display apparatus in general and to a movable electromechanical three-dimensional display and its method of use in particular.

2. Prior Art

It has been long desired to provide a three-dimensional relief image modeling display. A high-quality, three-dimensional display system would significantly impact, for example, new product modeling, entertainment, teaching, scientific research, and military planning.

In the past, systems for creating three-dimensional (3-D) displays involved moving a flat plate mirror or flexing a plastic mirror to reflect a cathode ray tube (CRT) image. Other techniques have used a silvered Mylar sheet stretched over a metal ring to create a mirror that when vibrated reflected the information displayed on the CRT in sync with the motion of the mirrored surface. These techniques and other techniques for converting a CRT image are discussed in the article "Terminal Puts 3-Dimensional Graphics On Solid Ground," by Harry S. Stover, *Electronics*, Jul. 28, 1981. Other methods of making three-dimensional displays are discussed in Helliwell, "Fish Tank' Display Creates True 3-D Images," *PC Week*, Vol. 6, Sep. 25, 1989, p.19.

However, these three-dimensional volume display techniques were limited because of their use with CRT screens. Further, such techniques have generally been unable to produce real-time images and have been limited by the possible vibration frequencies available for the CRT screens. Moreover, the employment of vibrating mirrors with relatively large mass has prevented substantial deflections, thus the image produced could not be viewed from all angles.

Three-dimensional volume images created by rotating displays have similar problems. One problem is that they are limited to only occupying the volume of space which is swept by the rotating screen. Such systems are disclosed by F. Garcia, Jr. in U.S. Pat. No. 4,871,231 and U.S. Pat. No. 5,172,266. For example, the '266 patent discloses an angled fiber optic bundle which rotates to project a 3-D image. However, this rotating bundle cannot be adjusted so that the individual fibers can be moved outwardly toward the viewer. Moreover, like most volume displays, the Garcia volume displays disclosed in the '231 patent and the '266 patent are limited to an arguably incomplete spacial or cylindrical volume. This is due to the restriction that the axis of rotation must pass obliquely through the plane of the screen.

An additional problem with rotating screen displays is the inconsistency of the image brightness at various viewpoints. Image brightness problems arise because of the minimal amount of light which is scattered off of the screen at angles to the plane of the screen which approximates zero degrees. Thus, because virtually no image reaches the eye at that angle, a very dim or totally blank area is created.

Another inherent problem with all three-dimensional volume displays is the inability of images in the display to exhibit the common optical traits of physical objects, such as, the reflection of light off the surfaces of objects, the inability to see the rear surface of an opaque solid object, and the refraction of light through lenses. In general, all volume displays thus possess a ghost-like transparent quality which results from the fact that they are mere optical illusions. These 3-D optical illusions can be seen, but cannot be touched and felt.

2

Others have attempted to solve the problems with three-dimensional imaging and modeling by projecting a two-dimensional image upon a moveable backdrop. U.S. Pat. Nos. 4,148,645 and 4,412,799 to Gates, hereinafter incorporated by reference, set forth typical related art displays of this type. The photogrammetric three-dimensional display systems revealed by Gates are generally provided with a flexible platen screen that is adjustable by moving rods set into a horizontal grid that is made up of support members and cross member strips.

Gates' platen screen is opaque and colored images are shown down upon it by overhead projectors. The rods can be adjusted either manually or automatically depending on the unit's particular embodiment. The automatically adjusting embodiment contains fiber optic tubes which are connected to photo cells. The photo cells cause a voltage at connected terminals in proportion to the amount of colored light received. A motor driven tube adjusts the fiber optic tube until a bluish-red condition is met. Once the bluish-red condition is met, the motor driven tube will stop. Thus, the entire flexible platen surface will assume the correct elevations to create a stereo model representative of the actual terrain of the projected image.

While this system works well when applied to photogrammetery and stereo relief modeling it is somewhat limited in its application. Overall, this system is limited because it projects an image upon a flexible latex, horizontal platen screen. For example, the latex platen screen restricts the rod movement because it is limited by its own elasticity. Moreover, because light is projected down onto to the screen, the projectors have to be relatively close to the flexible platen screen in order for there to be minimal attenuation of the projected light image as it passes through air. Furthermore, any object, such as a user's hand, that gets between the projector and the screen causes shadows and thereby distorts the image projected onto the flexible platen screen. Finally, the fact that the projector must be fairly close to the opaque platen screen also limits the dimensions of the objects one wishes to display in three-dimensions.

Gates also fails to provide an automated electromechanical system that allows the user to directly interface through the platen screen to a connected computer. The platen screen in Gates' system is either manually manipulated or automatically adjusted by means of photo cells connected to a computer having a conventional interface system such as a mouse or a keyboard.

What is needed is a more versatile 3-D display system which can more realistically display true-to-life sized images to the user. What is also needed is a system which is more interactive with the user so that the user can touch and feel the displayed object and thus more fully and completely interface with the display unit.

SUMMARY OF THE INVENTION

It is an object of this invention to provide a life-like, movable three-dimensional display which offers a truer representation and greater realism of what currently, at best, is a two-dimensional illusion of three-dimensional space.

It is another object of the invention to provide a display with the ability to discern various forms of touch, or any form of viewer/object display contact, thus the screen becomes interactive, making it possible to integrate the keyboard, mouse and display into one unit. Such a device would create a fully functional, personalized three-dimensional keyboard on the display and replaces the mouse with the user's finger.

It is yet another object of this invention to provide a small, electromechanical, omni-theater system which surrounds the user and easily incorporates systems that provide the user with sight, sound and touch to create a fully interactive experience.

DESCRIPTION OF THE DRAWINGS

For purposes of illustrating the invention, there are shown in the drawings forms which are presently preferred; it being understood, however, that this invention is not limited to the precise arrangements and instrumentalities shown. Drawings are for a basic illustration and in some cases common components are simply represented as a geometric shape.

In the drawings.

DETAILED DESCRIPTION

Figure 1:
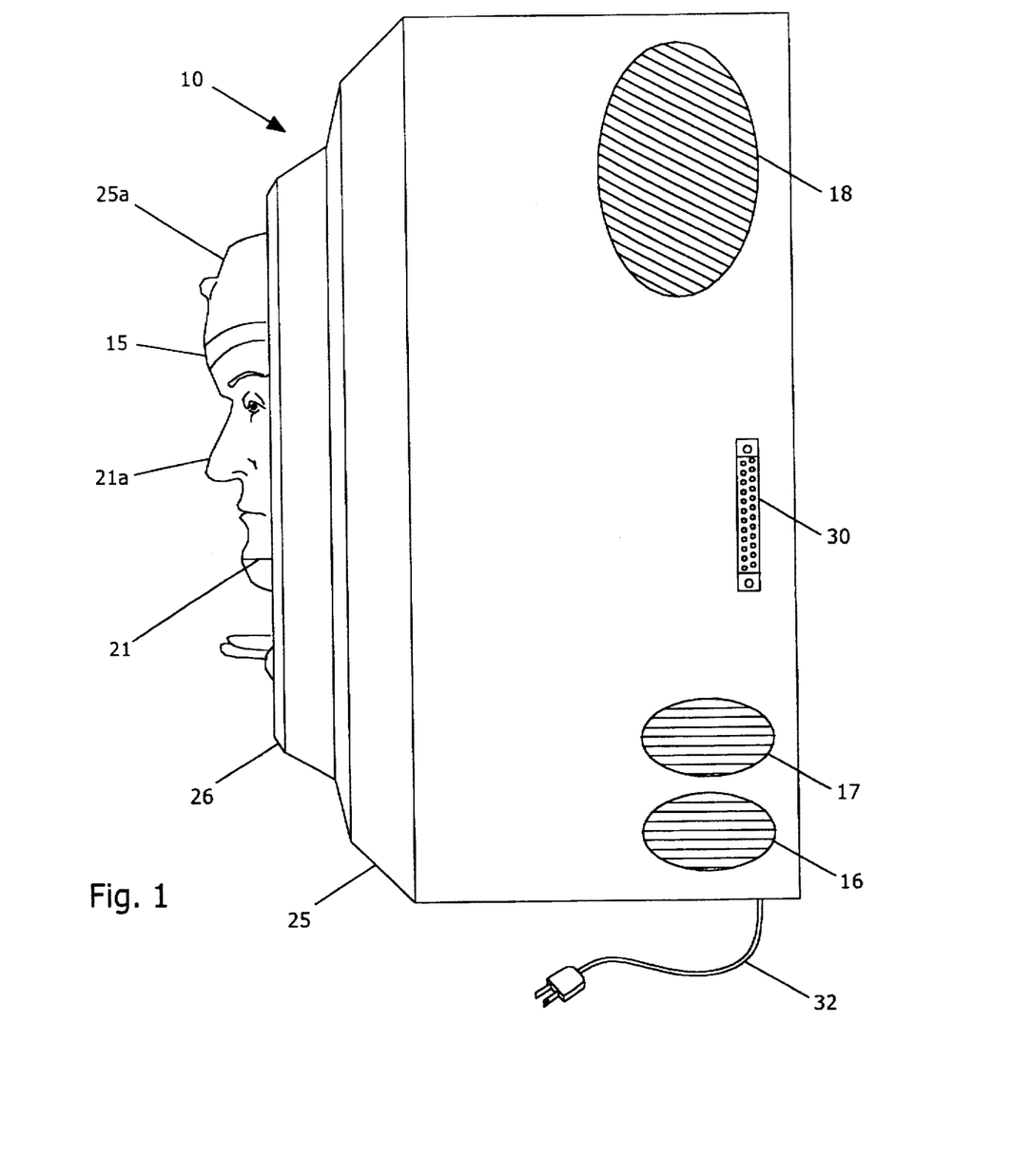
FIG. 1 is a side elevation view illustrating a three-dimensional display apparatus of the present invention.

The apparatus 10 of the present invention produces a three-dimensional relief image 15 of a projected video image as shown in FIG. 1. The apparatus 10 has a cooling vent 16 and an air intake 17 to provide sufficient air for cooling the apparatus and the like. The apparatus 10 is also provided with an audio speaker 18 so that sound may accompany the projected image.

Figure 2:
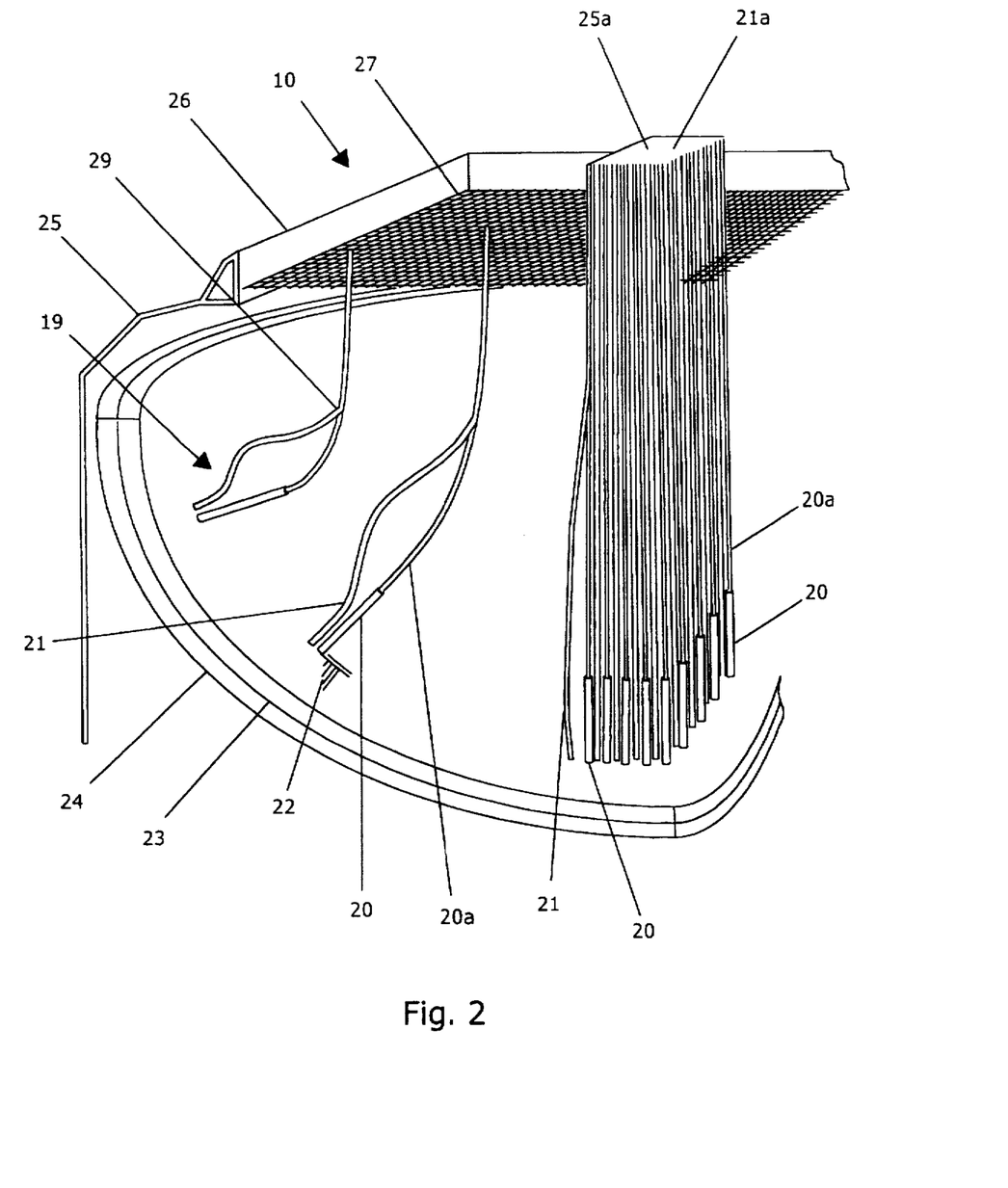
FIG. 2 is a rotated perspective cut-away view of the three-dimensional display apparatus of the present invention.
Figures 5, 5A:
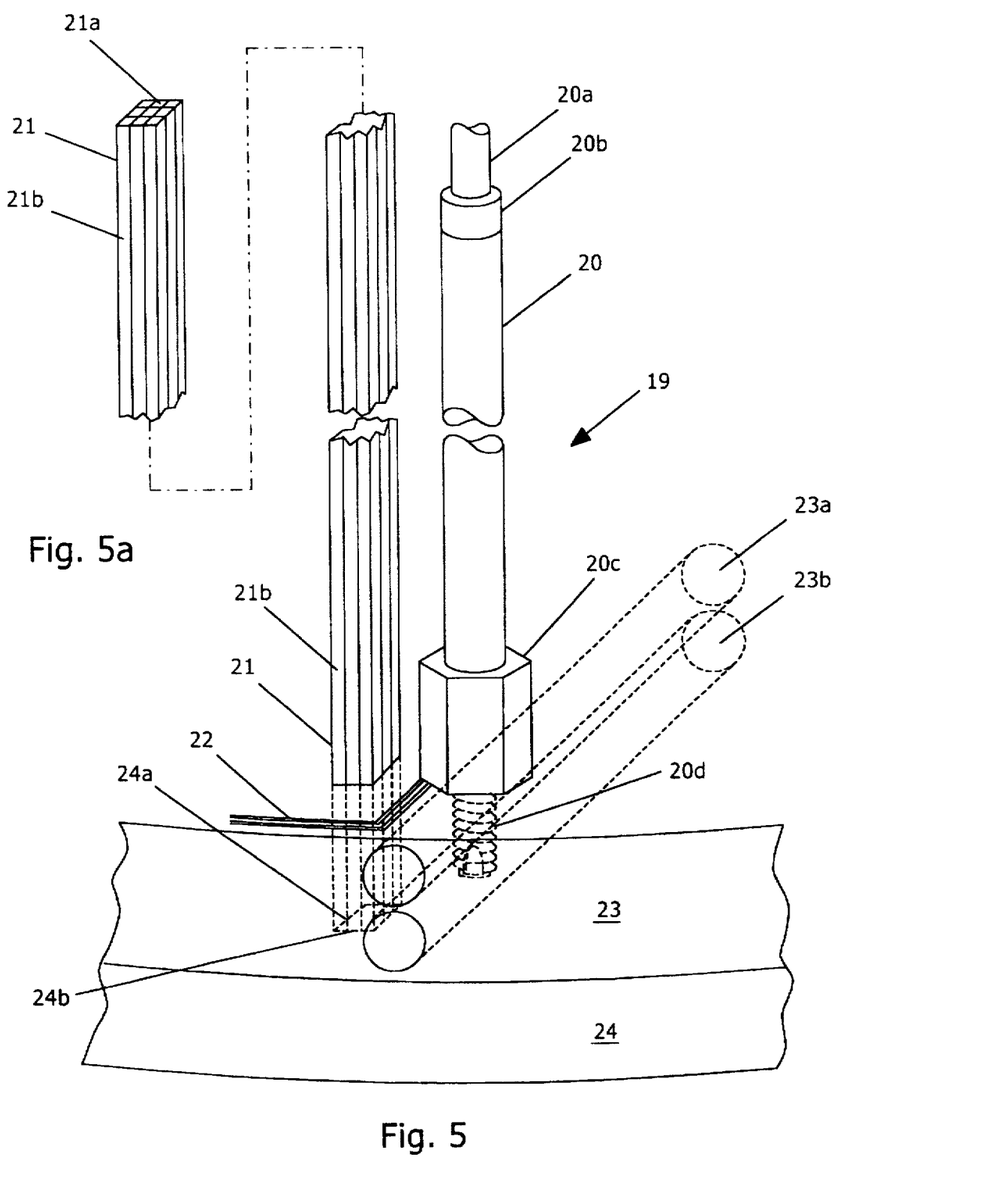
FIG. 5 is an enlarged perspective view of the invention of FIG. 1 showing a piston and a plurality of optic fibers.
FIG. 5a is a perspective view of the optic fibers of FIG. 5 further illustrating the optic fiber distal ends.
Figure 6:
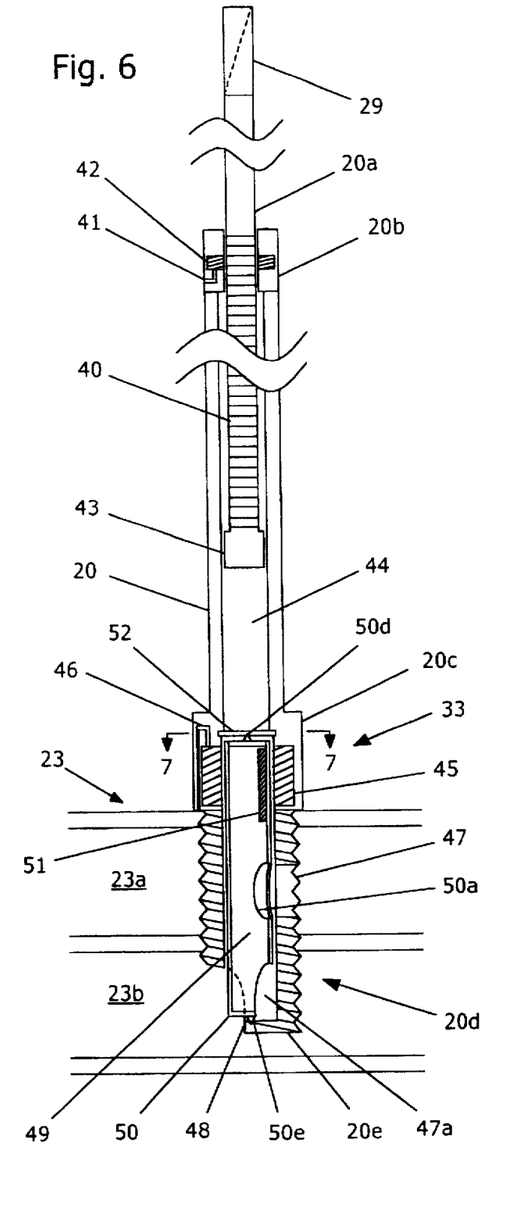
FIG. 6 is an enlarged detailed cut-away view of the piston and valve assembly of FIG. 5.

The apparatus 10 also has an optic fiber adjustment assembly 19 that is best shown in the cutaway view in FIG. 2. The optic fiber adjustment assembly 19 includes a multiple micro-pistons 20, and a plurality of optic fibers bundles 21. As shown in FIGS. 5 and 6, each micro-piston 20 includes a top, a bottom, and a piston rod 20a. At the top of the micro-piston 20 is a position sensor 20b. At the bottom of the piston 20, the piston is connected by a valve control housing 20c of a valve 20d. At its bottom, the valve 20 has a threaded valve stem 20e.

As shown in FIG. 5a, each optic fiber bundle 21 contains a multitude of individual fibers 21b which have distal ends 21a. The optic fiber bundles 21 are fairly flexible, yet in order to prevent collapsing and disorganization they are also rigid especially near the distal ends 21a of the optic fibers 21b. Moreover, each optic fiber bundle 21 is connected to the piston rod 20a of the piston 20, as shown in FIG. 2, by a coupler 29 which is also part of the assembly 19. Thus as each of the piston rods 20a extend or contract, the connected bundles 21 of individual optic fibers 21a also extend or contract.

The piston rod 20a and related optic fiber bundle 21 movement is driven by another part of the assembly 19, an integrated electrical and pneumatic circuit control system or controller 23, best shown in FIG. 6. The controller 23 includes a pneumatic source assembly 23c and an electrical circuit assembly 23d. Both assemblies 23c and 23d are generally embedded into the controller 23, much like the micro-electrical circuits generally known in the art are formed into printed circuit boards. The difference being in this case is that other hardware necessary to move the micro-pistons 20 is also integrated into the controller 23.

Figure 4:
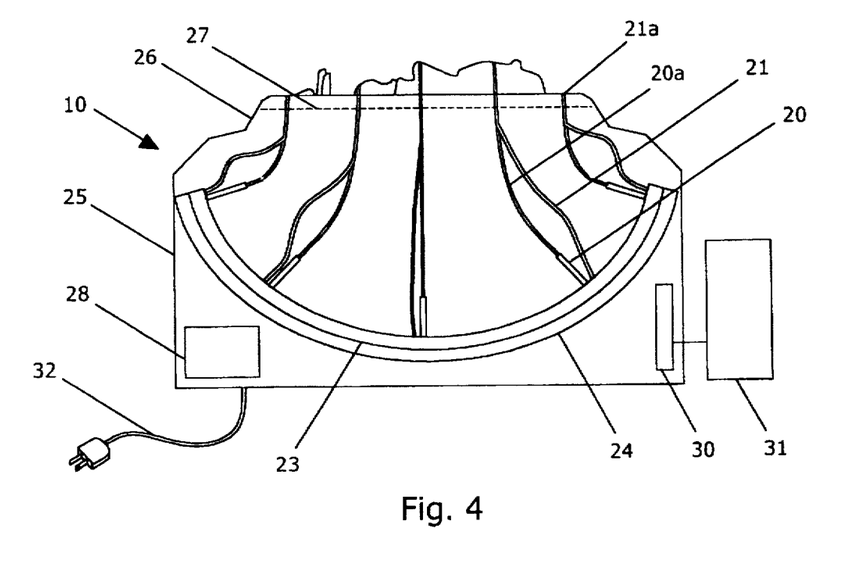
FIG. 4 is a reduced cut-away side view of the apparatus of FIG. 1 in a rudimentary form.

Referring now to FIGS. 4-6, in the preferred embodiment, the pneumatic source assembly 23c includes a vacuum line 23a and a pressure line 23b. The pressure line 23b is parallel to the vacuum line 23a. A pump 28 is in communication with the vacuum line 23a and the pressure line 23b and provides the lines with the respective air flow. For example, air may be drawn from the vacuum line 23a or air may be added to the pressure line 23b. Air for the pump 28 may be circulated to outside the apparatus 10 by air vent 17 in a protective outer shell or exterior housing 25.

A semi-hemispherical backlit image projector 24 is adjacent to the controller 23. The fiber optic bundle 21 proximal ends 24b pass through the controller 23 to the image projector 24. The projector 24 has its projection surface broken into small projection ports 24a either physically or by a computer program, to accommodate space for the piston 20 and the excess optic fiber of the optic fiber bundles 21. Thus, the video image is projected from the projector 24 and recreated in the distal ends 21a of the optic fibers 21 to produce the display relief image 15 in much the same way that pixels of a conventional two-dimensional display do. The distinction of the new relief image 15 is that it is formed by the distal ends 21a that are moved toward and away from the projector 24 in unison with the image and not merely by two dimensional pixels.

FIG. 2 shows an exterior housing 25 which completely encompasses all of the parts of the apparatus 10 including the vents 16, 17, the speakers 18, the optic fiber adjustment assembly 19, the controller 23, and the projector 24. FIG. 2 also shows the varied placement of six individual piston 20 and optic fiber bundle 21 sets within the exterior housing 25 as designated by a., b., c. and d. The letters a., b., and c. each denote two piston and optic fiber sets, with one set in a relaxed position and one set in a fully extended position. The letter d. denotes a bundle 21 extended above a display frame 26 which surrounds or frames a display 25a. The display 25a is made up of all the optic fiber bundle 21 distal ends 21a.

As illustrated in FIG. 2, the piston rods 20a are connected to the optic fiber bundle 21 by the coupler 29 at a point just under an optic fiber guide 27 when the piston 20 and optic fiber bundle 21 is fully extended away from the projector 24. The optic fiber guide 27 which is also part of the assembly 19 can be best described as a low friction mesh. The guide 27 controls lateral movement of the optic fiber bundles 21 and thus aids to maintain the proper order of the optic fiber bundles 21 after each contraction or extension.

While in the preferred embodiment the optic fiber adjustment assembly 19 comprises micro-pistons 20, optic fiber bundles 21, a controller 23, a coupler 29, and the optic fiber guide 27, one skilled in the art would realize that the adjustment assembly 19 need not be limited to this structure. For example in an alternative embodiment, the adjustment assembly 19 may be comprised of adjustment levers and a camming surface as described in U.S. Pat. No. 4,412,799 to Gates previously incorporated herein by reference. Further, in place of the levers and the camming surface, many mechanical or electromechanical systems may be suitable for moving the optic fibers, such as, gear trains, worm gears, or other turnably operated mechanical systems. Solenoids are also contemplated.

In order to keep the flexible individual optic fibers 21b together in a rigid optic fiber bundle 21, the optic fiber bundle distal ends 21a are fused or glued together from the distal ends 21a to the point where they are attached to coupler 29, as seen in FIG. 2. The remaining length of individual optic fibers 21b are left free and unattached to each other from the coupler 29 to the projection ports 24a located on the image projector 24. At that point, the optic fiber proximal ends 24b are configured in corresponding order to their optic fiber bundle distal ends 21a. This overall configuration of the optic fibers 21 retains the optic fibers' flexibility which is necessary so that when withdrawn to their lowest point, the individual optic fibers 21b are able to bend into the storage area between the optic fiber guide 27 and the controller 23. Moreover, the shear mass of optic fiber bundles 21 and the frame 26, which borders the distal ends 21a of the optic fibers, further act to generally keep the optic fiber bundle distal ends 21a in proper order as they are extended.

As illustrated in FIG. 4, a computer interface 30 and a computer 31, which are located either within or outside the exterior housing 25, are connected to the controller 23. A power supply 32 feeds power to the apparatus 10, the computer interface 30, and the computer 31. The computer interface 30 and computer 31 operably interact with the various parts of the apparatus 10 to oversee all the movement of the optic fiber bundles 21 necessary to form the display 25a. For example, when the sensors 20b determine the position of the distal ends 21a, the position is stored in a lookup table in the computer 31 via the computer interface 30. That information is then accessed through the computer interface 30 from the computer 31 when movement of the optic fiber distal ends 21a is desired. The physical formation of the display 25a updates about every 1/24th of a second for real time motion in sync with the projected video image.

Referring to FIG. 6, the piston 20 also includes a cylindrical wall 34, and a piston chamber 44 within the cylindrical wall 34. The piston rod 20a of the piston 20 is slidably received in the piston chamber 44. The piston rod 20a is extended from or contracted toward the projector 24 by air pressure or vacuum supplied by the lines 23a, 23b to the piston chamber 44.

The piston rod 20a is marked with a readable scale 40 somewhat like a UPC bar code which aids in determining the position of the distal ends 21a. A sensing unit 41 is part of the sensor 20b. The sensing unit 41 reads the markings on the readable scale 40, somewhat like a UPC bar code scanner reads a bar code, to determine the exact position of the distal end 21a. Those skilled in the art will realize that other ways of determining the distal end's position are available. For example, a quadrature detector may be used in such a manner.

Pressure in the valve 20d is controlled by a valve control assembly 33. The valve control assembly controls the movement of a valve cock 50. The valve cock 50 is generally tubular and has a bore 49 with four openings; two at the top 50c, one in the side 50a, and one in the bottom edge 50b. The valve cock bore 49 communicates with an upper opening 50c, a pressure inlet 47 and a vacuum outlet 48 located in the threaded stem 20e. The valve cock 50 has two pivot points, an upper pivot point 50d and a lower pivot point 50e. These valve cock pivot points 50d and 50e allow the valve cock 50 to rotate inside a bore 47a of threaded valve 20d with a minimal amount of friction. A spline 52 allows air to flow out of the piston chamber 44 into the vacuum line 23b and also into the piston chamber 44 from the pressure line 23a through the valve 20d. The spline 52 also prevents the valve cock 50 from being drawn into the piston chamber 44.

Figure 7:
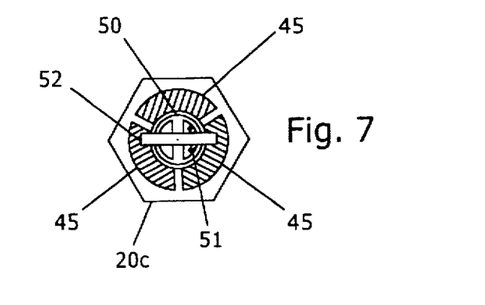
FIG. 7 is a top plan cut-away view of the valve along the line 7—7 in FIG. 6.

FIG. 7 shows a top cutaway view of the valve control housing 20c and the tri-position placement of electromagnets 45. The three electromagnets 45 are located within the valve control housing 20c. On the other hand, a permanent magnet 51 is embedded in the valve cock bore 49 of the cylinder valve cock 50. When one of the electromagnets 45 is activated, the permanent magnet 51 is attracted to it. Also shown is a top view of the spline 52 that the upper valve cock pivot point 50d is inserted into.

Figure 8:
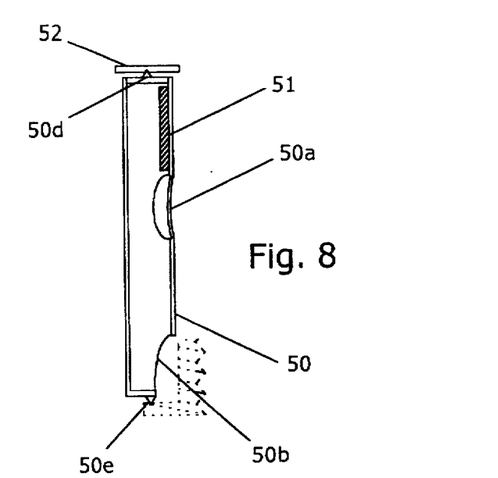
FIG. 8 is a view of the valve of FIG. 7 that has been extracted to show a valve cock within a threaded valve housing.
Figure 8A:
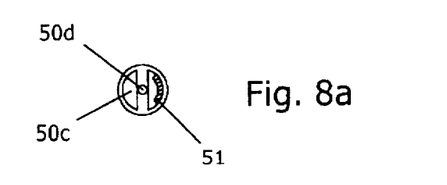
FIG. 8a is a top plan view of the valve cock of FIG. 8.
Figure 8B:
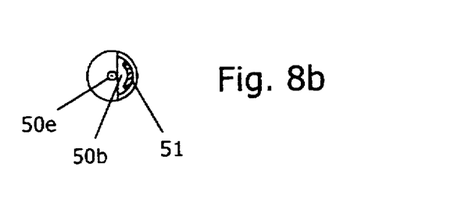
FIG. 8b is a bottom view of the valve cock of FIG. 8.

FIG. 8 shows an extracted side view of the valve cock 50. Top view FIG. 8a and bottom view FIG. 8b show the openings 50c and 50b in better detail. Also shown are pivot points 50e and 50d and their contact with the threaded valve 20d and upper spline 52.

Referring in general to FIGS. 4–8b, the electrical circuit assembly 23d includes the power supply 32, a printed circuit 22 embedded in the controller 23 which connects to the power supply 32, electromagnet leads 46 connected to the printed circuit 22, electromagnets 45 connected to the electromagnet leads 46, and sensor leads 42 which are also connected to the printed circuit 22. The sensor leads 42 are in turn connected to the position sensors 20b. As explained earlier, the position sensors 20b determine the position of the piston rods 20a which then aid in determining the position of the optic fibers 21.

Figure 9:
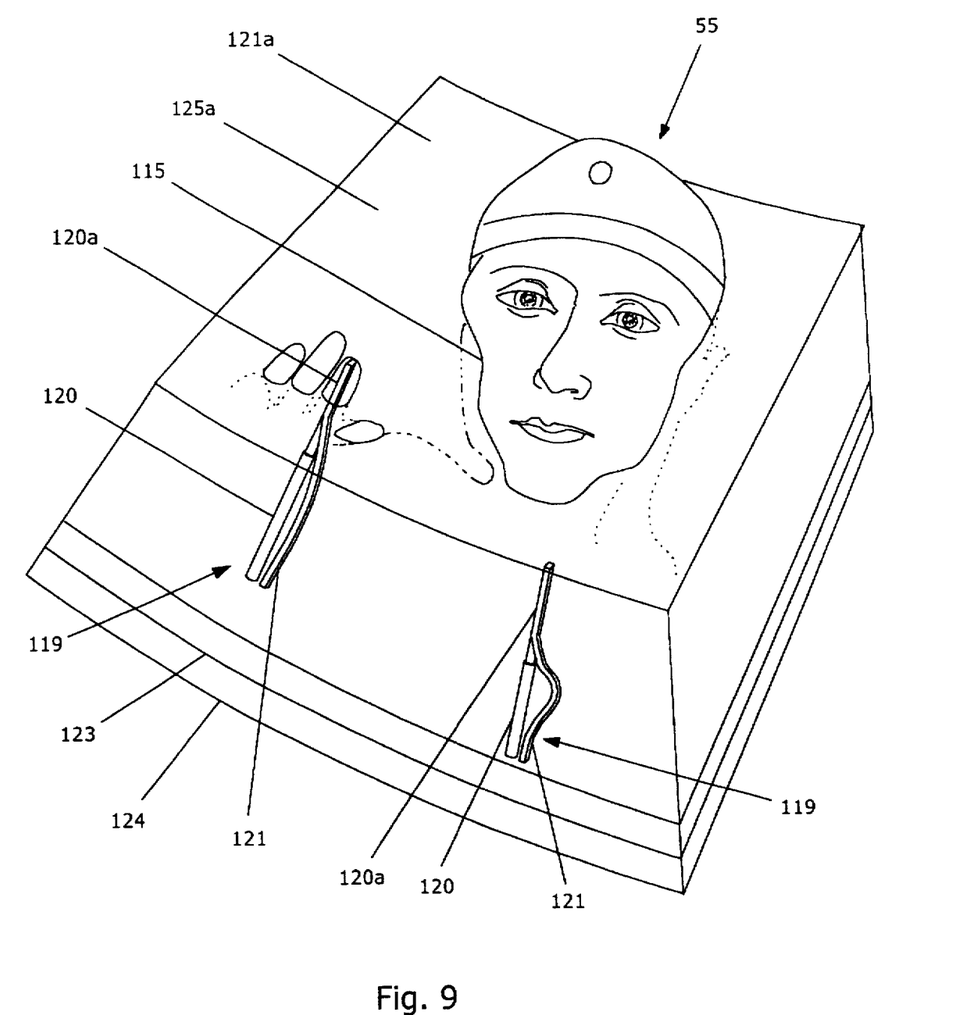
FIG. 9 shows an alternative embodiment of a single panel.
Figure 10:
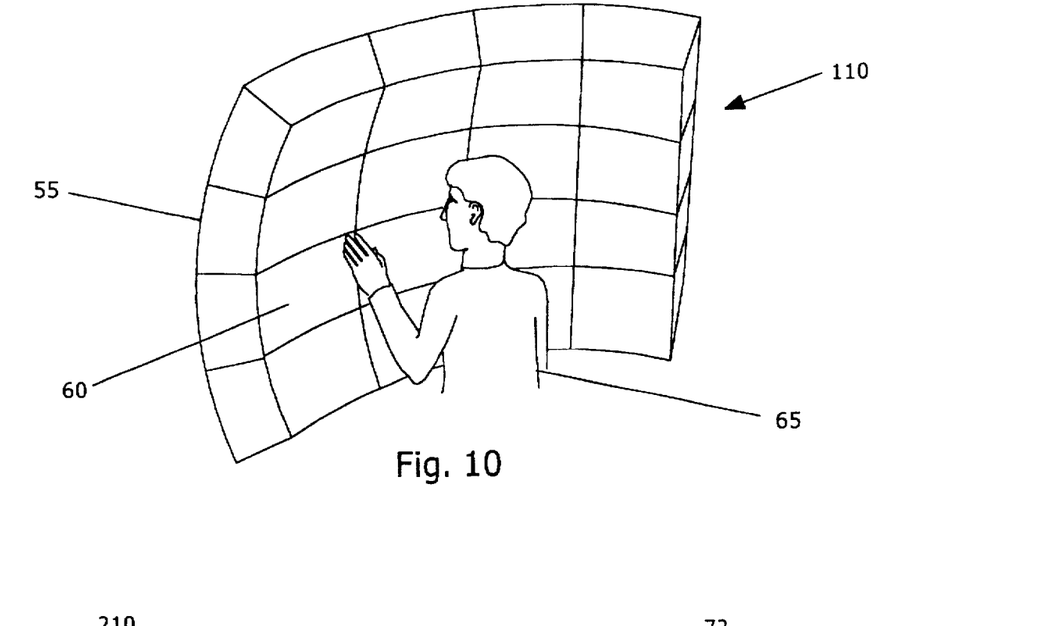
FIG. 10 shows another embodiment having a set of panels, like the panel shown in FIG. 9, grouped to function as one large display having a generally curvilinear viewing surface.

Referring to now to FIGS. 9–10, in another preferred embodiment an apparatus 110 for displaying a three-dimensional relief image 115 is comprised of a plurality of panels 55 much like the display apparatus 10 discussed previously. These panels 55 are constructed and arranged to form a curvilinear viewing surface 60. Each of the panels 55 has many components in common with display apparatus 10. For example, each panel 55 has an image projector 124, a plurality of optic fibers 121 having distal ends 121a and proximal ends 124b (not shown), the distal ends 121a radiating outwardly from the image projector 124, a display 125a formed by the distal ends 121a of the optic fibers 121, and an optic fiber adjustment assembly 119 that moves the distal ends of the optic fibers 121 away from and toward the image projector 124.

Referring in particular to FIG. 9, the panel 55 is similar in structure to the single display apparatus 10. However, the panel 55 has a shape that has a larger base to display ratio.

Figure 11:
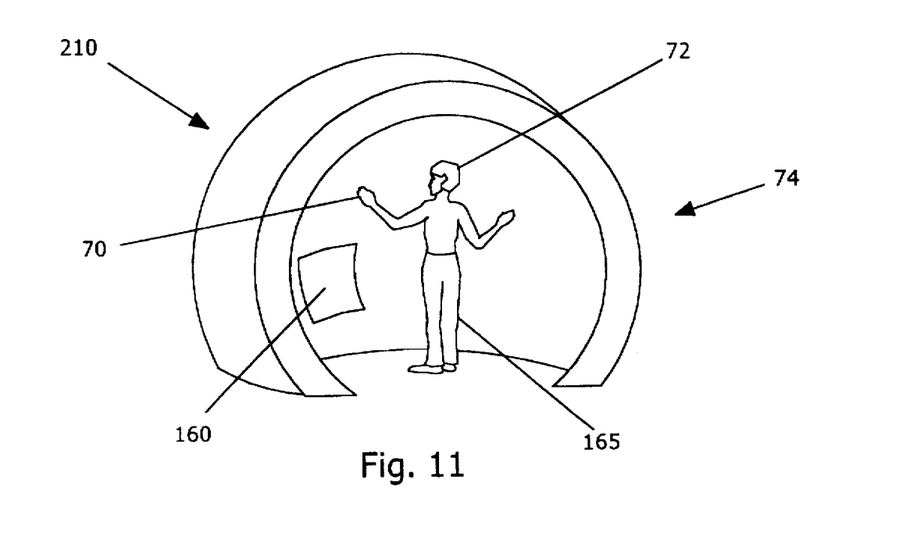
FIG. 11 shows another embodiment which is a generally spherical viewing theater consisting of many single display panels, like the one in FIG. 9, functioning as one display.

The concave configuration of the panel 55 allows for ease in joining two or more panels 55 together. As shown in FIG. 10, the panels 55 may be grouped into one large display or curvilinear viewing surface 60. Referring to FIG. 11, an alternative preferred embodiment is shown where the curvilinear viewing surface 160 nearly surrounds the user 165 creating a generally spherical personalized viewing theater 74.

Figure 12:
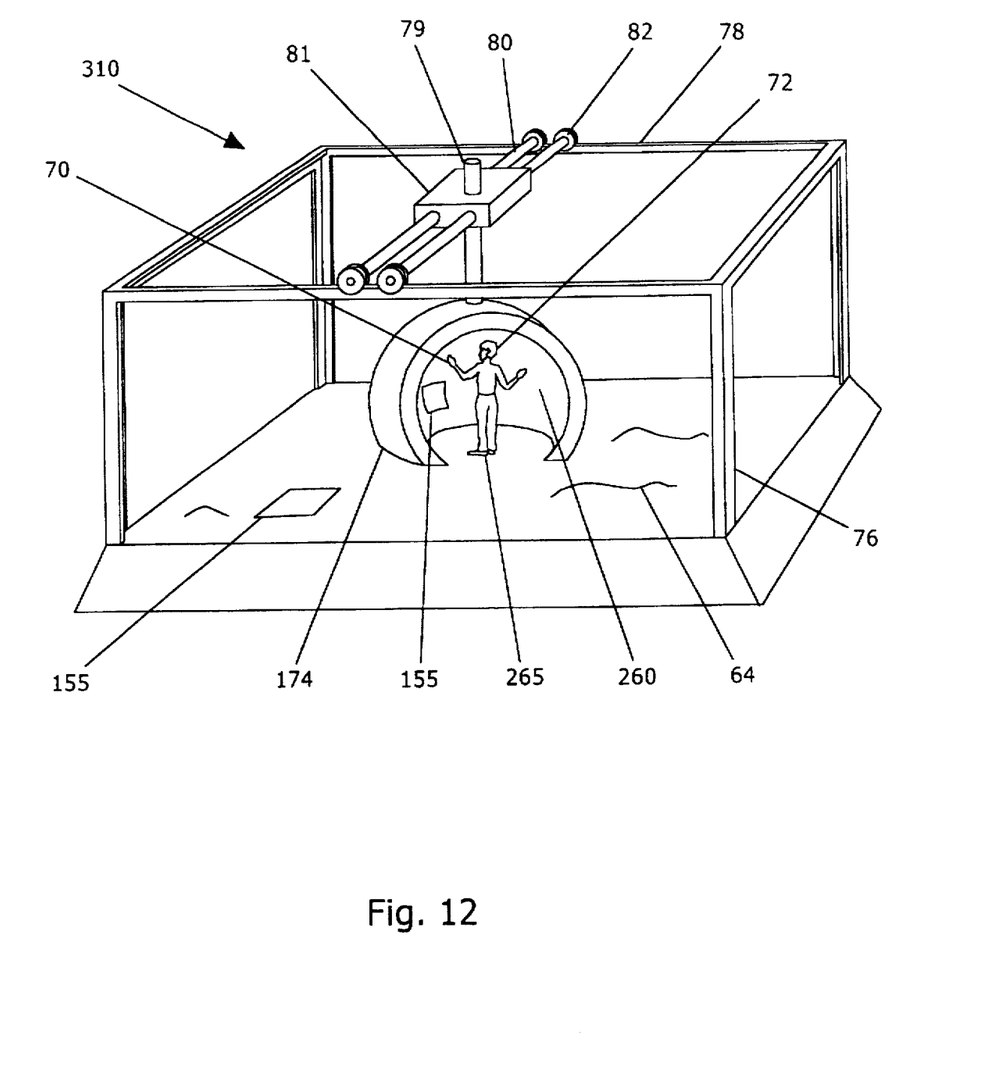
FIG. 12 shows a generally spherical viewing theater suspended, like the one in FIG. 11, on a track over a floor of panels.

Referring to FIG. 12, another preferred embodiment further comprises a floor 64 which is made up of a plurality of panels 155. The panels 155 are identical in structure to the apparatus 10 and are able to move in a similar manner to simulate terrain. A support structure 76 is supported on the ground below the floor 64. A track 78 is carried by the support structure 76. The track 78 may be carried by the support structure 76 in various ways, for example it can be movably attached or welded into place.

In this embodiment, a motorize overhead unit 81 contains all the mechanisms to move the generally spherical viewing theater in any direction. For example, a pivotal vertical axle 79 allows the generally spherical personalized viewing theater 174 to rotate in a horizontal plane and move up or down in a vertical plane. The motorize overhead unit 81 also moves back and forth along an axle/rail combination 80 while wheels 82 allow the unit to move along the track 78. Thus any placement or direction of movement of the generally spherical personalized viewing theater 174 is achieved by the combining of the motor to axle drives.

A sensing device 70, such as a motion sensor, may be added to the apparatus 310 on the panels 155 within the generally spherical personalized viewing theater 174 to detect movement of a user 265 in relation to the curvilinear viewing surface 260.

In Use and Operation

Figure 3:
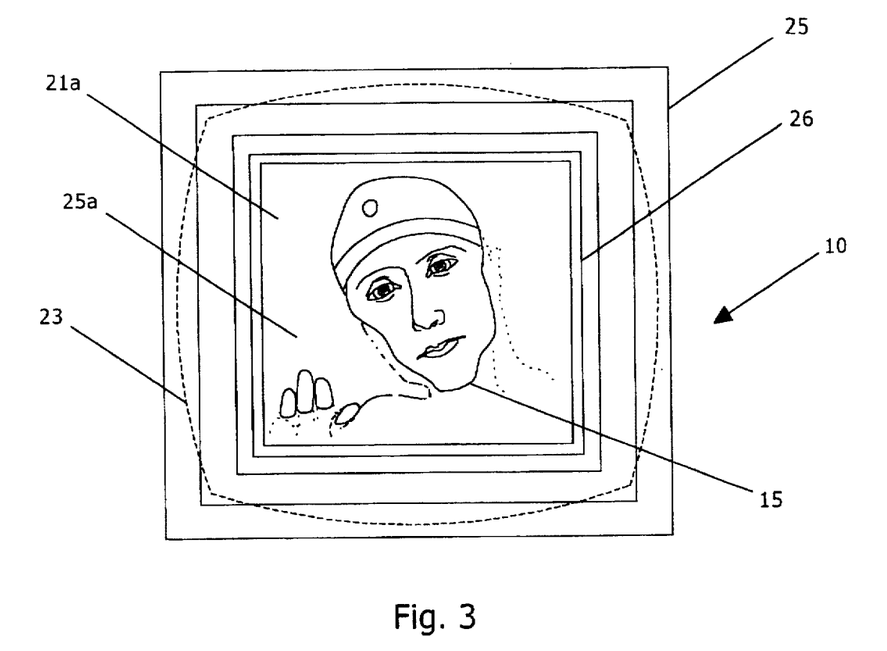
FIG. 3 is a reduced front view of the exterior of the apparatus of FIG. 1 as it would appear to the user during viewing.

In the embodiment shown in FIGS. 1–4, a movie program stored in a first lookup table on a CD ROM or some other media is loaded into the computer 31. The program contains information relating not only to images and sound, as does a conventional movie videotape or laser disc, but also contains information relating to the relative position of each optic fiber bundle 21. As mentioned above, the individual optic fibers 21b have distal ends 21a and proximal ends 21b. The distal ends 21a are mounted in the ports 24a located in the image projector 24 and radiate outwardly from the image projector. The bundles of optic fibers 21 are designed to carry light waves from the image projector 24 to the tips of the distal ends 21a. Thus when a movie is played from the CD ROM by the apparatus 10, the relief image 15, when viewed by a user from in front of the display 25a as shown in FIG. 3, appears in the colors that are projected by the image projector 24.

Figure 13:
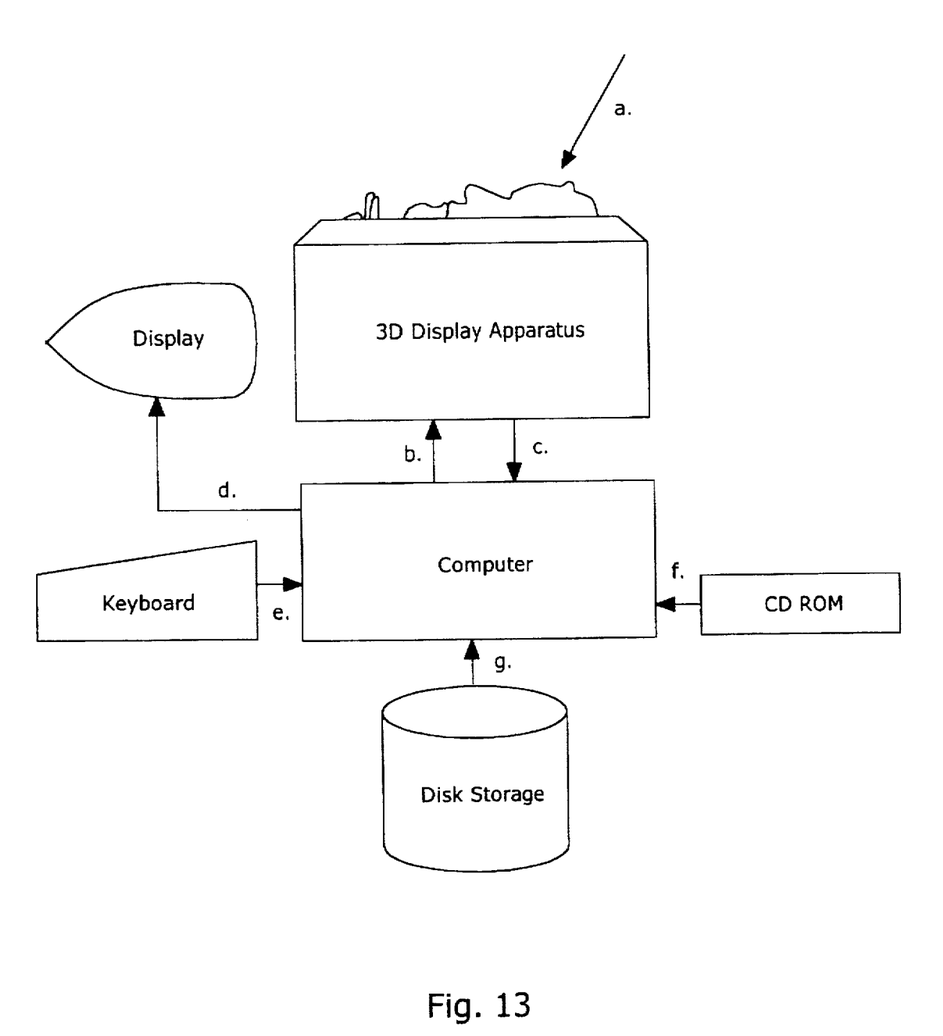
FIG. 13 is a block diagram of the apparatus.

While reading the CD ROM, the computer 31 of the apparatus 10 not only drives the image projector 24 to project images and sounds, but it also sends signals via the interface 30 to the optic fiber adjustment assembly 19 to move the optic fiber bundles 21. As best illustrated in FIG. 13, once the computer 31 reads a position from the first lookup table stored on the CD ROM (f.), it compares the current position of the distal end 21a stored in a second lookup table to that distal end position read from the first lookup table stored on the CD ROM. This second lookup table is stored in the memory or disk storage unit of the computer 31. For example, it can be stored in the computer's Random Access Memory (RAM) or Read Only Memory (ROM). After comparing the current position received from g. to the reference position received from f., the computer 31 transmits a signal (b.) via the computer interface 30 to the apparatus 10.

The sensing unit 20b, shown in FIGS. 5 and 6, continuously determines the current position of the distal ends 21a of the bundles 21. As previously described, in one preferred embodiment, an input (a.) may come from a user 65. As shown in FIG. 13, the input at a. changes the position of the distal ends 21a. Once the movement of the optic fiber distal ends 21a is noted, an electronic signal is generated. This generated signal corresponds to a computer command, much like the pressing of a key on a computer keyboard or the clicking of a computer mouse corresponds to a computer command. For example, the computer command generated from the user's touch may be the command to start the movie program.

Referring now to FIGS. 2 and 13, after receiving the signal (b.) from the computer 31 to move the distal ends 21a, the assembly 19 then drives the piston rods 20a to extend or contract. As the piston rods 20a extend and contract, the connected bundles 21 of individual optic fibers 21a also extend or contract. Again during each of these extensions and contractions, the position of the optic fiber distal ends 21a is constantly being noted by the sensor 20b and then is updated in the second lookup table by the computer 31.

Referring to FIGS. 5–8b, the computer 31 controls the movement of the piston rods 20a by sending signals (b.) through the computer interface 30 and to the printed circuits 22 in the assembly 19. The printed circuits 22 carry the signal to the valve control assembly 33. These electrical signals control air flow to the threaded valve 20d by activating one of the electromagnets 45 of the valve control assembly 33. The electromagnetic field created by an electromagnet 45 attracts the permanent magnet 51 of the valve cock 50.

The attraction of the permanent magnet 51 to one of the electromagnets 45 causes the rotation of the valve cock 50. During rotation, the cylinder valve cock 50 stops in one of three positions: (1) aligning valve cock pressure inlet 50a with valve pressure inlet 47, allows the piston chamber 44 to become pressurized and in turn extends the piston rod 20a and the optic fiber bundle 21 away from the projector 24, (2) aligning valve cock vacuum outlet 50b with valve vacuum outlet 48, thus creates a vacuum in the piston chamber 44 and in turn contracts the piston rod 20a and the optic fiber 21 toward the projector 24, or (3) a third position where neither pressure nor vacuum openings are aligned thus closing off the flow of air to the valve 20d.

In the third or closed position, the piston rods 20a hold their positions because they have reached their desired position. Once in the desired position, whatever pressure is inside the chamber 44, continues to be maintained. Because the pressure inside the piston chamber 44 does not change, the piston rod 20a does not move.

It will be appreciated by one skilled in the art that other systems for providing pressure to move the optic fibers and pistons are available and the present invention is not to be construed as limited to those systems specifically set forth herein. For example, a hydraulic system for moving the optic fibers may work equally as well.

Referring to the embodiment in FIG. 12, the panels 155 of the apparatus 310 are grouped together like blocks of an igloo wall, and therefore create a generally spherical viewing theater 174. FIG. 11 shows an alternative embodiment that has a spherical viewing theater 74 which does not move.

In this embodiment, the headset 72 is worn by the user 265. The headset 72 interfaces with the sensor 70 to move the curvilinear viewing surface 260 in conjunction with the movement of the headset 72. For example, the headset may emit laser light from several ports on the headset 72. The surface 260 has receiving ports capable of receiving the emitted laser light. Thus, as certain receiving ports receive laser light from the headset 72, the curvilinear viewing surface 260 rotates until the center of the surface is aligned with the emitting ports on the headset 72. The surface 260 always rotate in accordance the headset 72 movement on the head of the user 265. In this embodiment, the curvilinear viewing surface 260 also extends generally around the user 265, forming a generally spherical personalized viewing theater 174.

As mentioned earlier, the piston rod sensors 20b can also detect any unprogrammed piston rod 20a and distal end 21a movement. The computer 31 then processes these externally caused distal end 21a disruptions for, placement, size, shape, speed and angle. With these five different levels of input information, the distal ends 21a as an input device have a much greater range of input information than a conventional keystroke or a mouse click. Thus, as shown in FIG. 12, when the user 265 enters the theater 174, a curvilinear viewing surface 260 will give the user options. For example, when the user walks into the theater 174 a phrase appears across panels 155, such as "touch any panel." The user 265 then reaches out and selects an option by touching a portion of the surface 260.

When the user 265 touches the surface 260, the user 265 displaces at least one distal end 21a of an optic fiber 21b with a finger, a hand, or some other object. The apparatus' sensors 20b then sense the movement of the displaced optic fibers 21b. The sensor 20b then transmits an electronic signal from the sensor to the computer 31. The computer 31 receives the signal and selects a response from a third lookup table corresponding to the signal received by the computer. The computer 31 then starts the piston rod 20a and distal end 21a movement sequence that corresponds to the computer selected response, and thus executes that response.

Once the user 265 makes contact with any one of the panels 155, the computer 31 starts a computer program which is interactive for several kinds of user contact. At times the user can simply just view a movie, like a regular television set. In other cases, the program may require the user to have a certain amount of viewing surface contact, therefore the user 265 needs to touch the surface 260 for that reason.

In another embodiment the user may initiate the program outside the theater on a keypad display or regular computer keyboard. In still another embodiment, a sensor may be used to detect the entrance of a user and start the program.

Once the system is on, motion sensors 70 mounted on the viewing surface 260 help to keep the spherical theater 174 about the user 265 as the user moves about. Therefore, the viewing surface 260 is constantly in front of user, even as the user turns and moves about the floor 64 and the displayed relief image 115 formed from the individual optic fibers always projects out toward or away from the user.

In the preferred embodiment, a helmet or a head set 72 is integrated into the apparatus 310 so that the computer 31 can keep track of where the user 265 is positioned. Thus, the apparatus 310 knows where to reach out to touch or avoid touching the user 265. For example, if the user 265 is watching a movie about aliens, an alien could lunge out the viewing surface 260. In reality, the surface 260 shoots fibers 21b outwardly toward the user simulating the hand of the alien as best shown in FIG. 9. Thus, the alien lunges out at the user 265 in a 3-D form. The display 25a then reverts back into the surface 260 as the alien movie scene progresses.

In another embodiment, photosensitive sensors may be individually placed on hands and feet of the user to keep track of where the user's hands and feet were in relation to the surface.

In an additionally embodiment illustrated in FIG. 13, a conventional keyboard can be used to access (e.) the computer 31 to act as an alternate or adjacent input device. Further, a conventional CRT Display (d.) may act as a two dimensional (2-D) monitor for the apparatus 10. It may also work as an additional informational display for the keyboard input.

Many other changes could be made to the invention as described above without departing from the spirit thereof. The scope of these changes will become apparent from the appended claims.

I claim:

1. An apparatus capable of changeably forming and displaying a three-dimensional relief image comprising:
   a) an image projector;
   b) a plurality of optic fibers having distal ends and proximal ends, the distal ends radiating outwardly from the image projector;
   c) a display formed by the distal ends of the optic fibers; and
   d) an optic fiber adjustment assembly capable of controllably moving the distal ends of the optic fibers away from the image projector thus forming a three-dimensional relief image.

2. The apparatus of claim 1, further comprising:
   a) at least one sensor to determine a location for each of the distal ends of the optic fibers; and
   b) a computer that interfaces with the sensor.

3. The apparatus of claim 1 wherein the optic fiber adjustment assembly comprises:
   a) a piston;
   b) a controller which controls the movement of the piston away from the image projector; and
   c) an optic fiber guide which maintains order of the optic fibers.

4. The apparatus of claim 3 wherein the piston comprises:
   a) a cylindrical wall;
   b) a piston chamber within the cylindrical wall;
   c) a piston rod which is received in the piston chamber; and
   d) a piston rod position sensor for determining the position of the piston rod.

5. The apparatus of claim 3 wherein the controller comprises:
   a) a pneumatic source assembly; and
   b) an electrical circuit assembly.

6. The apparatus of claim 5 wherein the electrical circuit assembly includes:
   a) a power supply;
   b) a printed circuit embedded in the controller which connects to the power supply;
   c) an electromagnet lead connected to the printed circuit;
   d) an electromagnet connected to the electromagnet lead; and
   e) a sensor lead connecting the printed circuit to the sensor.

7. The apparatus of claim 6, wherein the pneumatic source assembly includes:

a) a vacuum line;

b) a pressure line parallel to the vacuum line;

c) a pump in communication with the vacuum line and the pressure line;

d) a valve having a bore in communication with the vacuum line and the pressure line;

e) a valve control housing which connects the piston to the valve; and f) a valve control assembly received in the valve bore.

8. The apparatus of claim 7, wherein valve control assembly comprises:

a) a valve cock having a bore therein which communicates with an upper opening, a pressure inlet and a vacuum outlet located in the valve; and b) a permanent magnet in communication with the valve cock bore.

9. The apparatus of claim 1, further comprising:

a) an exterior housing encompassing the image projector, plurality of optic fibers, and optic fiber adjustment assembly;

b) a frame bordering the distal ends of the optic fibers; and c) an optical fiber guide to maintain order of the plurality of optical fibers.

10. The apparatus of claim 1, wherein a plurality of displays are constructed and arranged to form a viewing surface, a portion of which is generally spherical.

11. The apparatus of claim 1, wherein the optic fiber adjustment assembly moves the distal ends of the optic fibers away from and toward the image projector.

12. The apparatus of claim 1, wherein the projector is constructed of a plurality of projection ports.

13. An apparatus capable of changeably forming and displaying a three-dimensional relief image comprising a plurality of panels constructed and arranged to form a curvilinear viewing surface, wherein each of the panels includes:

a) an image projector;

b) a plurality of optic fibers having distal ends and proximal ends, the distal ends radiating outwardly from the image projector;

c) a display formed by the distal ends of the optic fibers; and d) an optic fiber adjustment assembly that moves the distal ends of the optic fibers away from the image projector thus forming a three-dimensional relief image.

14. The apparatus of claim 13, further comprising:

a) a floor below the viewing surface; and b) a support structure adjacent to the floor.

15. The apparatus of claim 14, further comprising:

a) a track carried by the support structure; and b) an axle in operable communication with the track.

16. The apparatus of claim 15, further comprising a motorized unit which drives the axle along the track and rotates the curvilinear viewing surface about a vertical axis.

17. The apparatus of claim 16, further comprising a motion sensor to detect movement of a user in relation to the curvilinear viewing surface.

18. The apparatus of claim 17, further comprising a headset worn by the user wherein the user headset interfaces with the motion sensor to move the curvilinear viewing surface in conjunction with the movement of the headset.

19. The apparatus of claim 14, wherein the floor comprises a plurality of panels.

20. A method of inputting information into a display by a user comprising:

a) providing an image projector, a plurality of optic fibers having distal ends radiating outwardly from the image projector, a display formed by the distal ends of the optic fibers, a sensor to determine the position of the optic fibers, and a computer to interface with the sensor;

b) displacing a distal end of an optic fiber;

c) sensing the movement of the displaced optic fiber;

d) transmitting a signal from the sensor to the computer;

e) receiving the signal;

f) selecting a response from a lookup table corresponding to the signal received by the computer; and g) executing the response.

* * * * *